Sept. 13, 1966 R. CZEKALLA 3,272,106
OPTICAL COPYING MACHINE
Filed Dec. 9, 1964 3 Sheets-Sheet 2

INVENTOR.
ROLAND CZEKALLA
BY

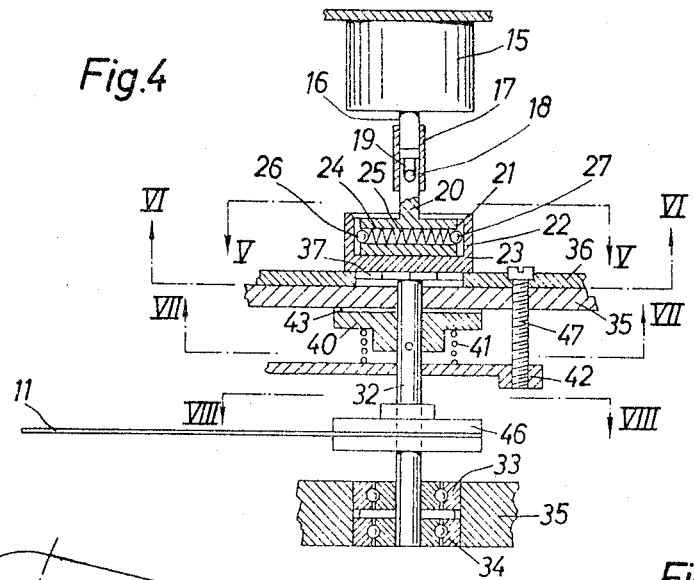
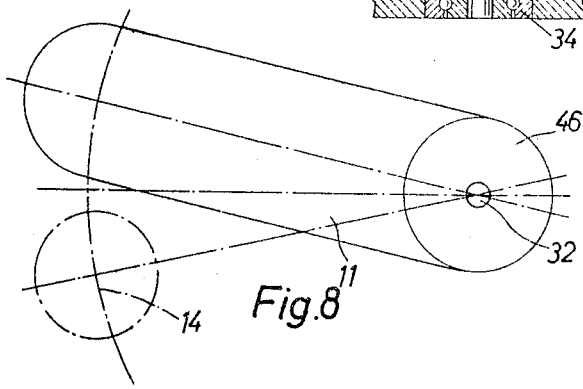
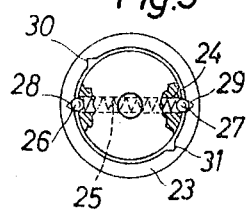
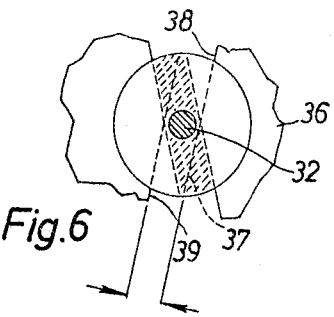
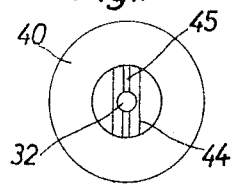

3,272,106
OPTICAL COPYING MACHINE
Roland Czekalla, Munich, Germany, assignor to Agfa
Aktiengesellschaft, Leverkusen, Germany
Filed Dec. 9, 1964, Ser. No. 417,034
Claims priority, application Germany, Dec. 10, 1963,
A 44,749
12 Claims. (Cl. 95—58)

The present invention relates to optical copying machines.

In particular, the present invention relates to machines for making photographic reproductions, especially on a roll of light-sensitive paper, and in particular the present invention relates to a machine of this latter type in which the shutter is electromagnetically actuated.

Machines of this latter type conventionally take many different forms. For example, in one form of machine of this latter type a jalousie shutter construction is used, but this structure has the disadvantage of providing an extremely large surface which must be controlled so that a large number of jalousie components must be actuated, and particularly where the shutter must be operated at high speed such construction is not of very great advantage. It is also known to use sector-shaped shutter elements, but these also provide an extremely large surface area which must be controlled. While it is also known to use sector-shaped shutter blades in a shutter similar to that used in a camera, this latter structure is quite expensive and renders the objective difficult to get at. For example renders the objective difficult to get at. For example where the objective is required to be exchanged, so as to provide the device with an objective of a different focal length so as to change the degree of enlargement, it is very costly to provide the change in the objective with this latter type of machine.

It is accordingly a primary object of the present invention to provide an optical copying machine of the above type where the shutter is constructed in such way that it can be operated with high speed while providing a uniform distribution of illumination and while at the same time having a relatively simple construction.

Furthermore, it is an object of the present invention to provide a structure of this latter type which renders the objective easily exchangeable for another objective.

In addition, it is an object of the present invention to provide for a structure of the above type a shutter which will not rebound and vibrate when it is moved from one position to another, so that accidental exposure due to vibratory movement of the shutter at the end of its stroke is reliably avoided.

An additional object of the present invention is to provide an arrangement which enables the shutter to be situated in the plane of the objective, so that in this way during turning of the shutter a uniform illumination of the positive plane can be achieved.

Also, it is an object of the invention to provide a structure of the above type which gives easy access to the objective whenever desired.

With the above objects in view the invention includes, in an optical copying machine, an objective means which has an optical axis and a rotary shaft means located adjacent the objective means and extending parallel to the optical axis thereof. A shutter means is carried by the rotary shaft means to be turned therewith between positions opening and closing the objective means, and an electromagnetic means is operatively connected to the shaft means for turning the latter to displace the shutter means between its positions. This electromagnetic means is preferably a rotary electromagnetic means which at each actuation turns through a stroke which is of an angle greater than the angle through which the shutter means turns when displaced between its positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 shows components illustrated in FIG. 3 but on a larger scale than FIG. 3 particularly for the purpose of illustrating the manner in which the parts function;

FIG. 5 is a fragmentary top plan view of a clutch means of the invention, taken along line V—V of FIG. 4 in the direction of the arrows;

FIG. 6 is partly sectional fragmentary plan view of a stop means of the invention, taken along line VI—VI of FIG. 4 in the direction of the arrows;

FIG. 7 is a transverse illustration of a brake means of the invention, taken along line VII—VII of FIG. 4 in the direction of the arrows; and FIG. 8 is a schematic illustration of the manner in which the shutter means is operated.

Figure 1:
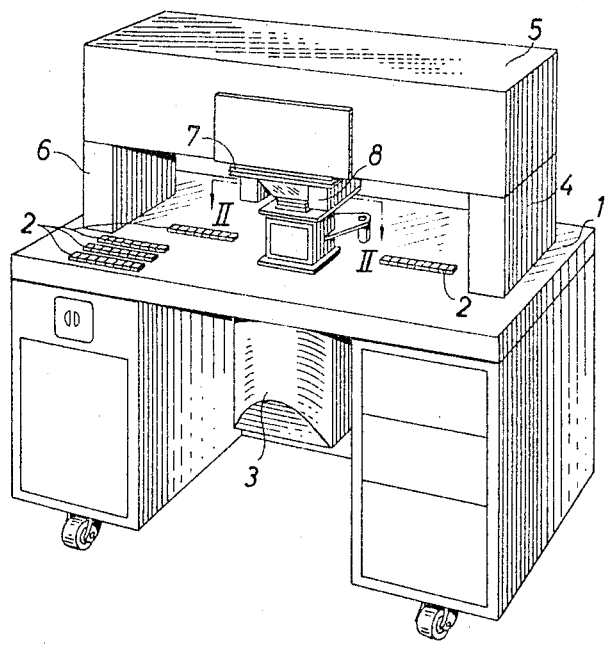
FIG. 1 is a schematic perspective illustration of an optical copying machine which is provided with the structure of the invention.

FIG. 1 shows a conventional optical copying machine provided with the shutter structure of the invention. Beneath the table top 1 of the machine, this table top 1 being provided with the keyboard 2 for controlling the exposure, is situated the lamp housing 3. Feet 4 and 6 are carried by and extend upwardly from the table top 1, and these feet carry the positive-carrier structure 5 in which is situated the unillustrated roll of light-sensitive paper provided on one surface with a light-sensitive emulsion as is well known. The paper is advanced in suitable increments so as to provide successive exposures which will produce photographic reproductions on the paper, as is well known in the art. The positive-carrier 5 has fixedly connected thereto one end of a flexible bellows assembly 7. This assembly 7 serves to connect to the positive carrier 5 an objective carrier 8 capable of being adjusted in a well known manner which is not illustrated in the drawings.

Figure 2:
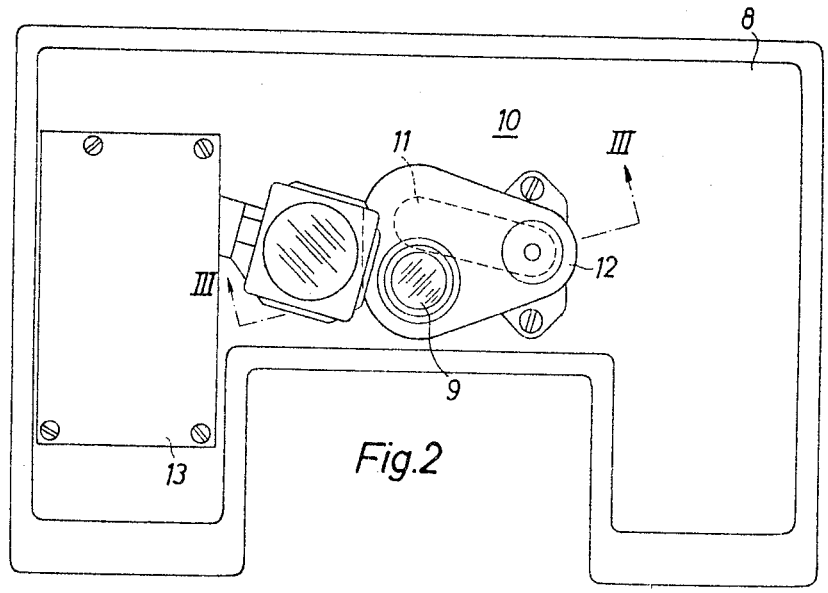
FIG. 2 is a plan view, on an enlarged scale as compared to FIG. 1, of the machine of FIG. 1 as seen along the line II—II of FIG. 1 in the direction of the arrows.

As may be seen from FIG. 2, the objective carrier 8 carries an objective means 9 as well as a shutter means 10, this shutter means 10 including a single shutter blade 11 and a drive means 12 operatively connected to the shutter blade 11 for actuating the latter. In addition the structure includes a filter assembly 13 indicated at the left of FIG. 2.

Figure 3:
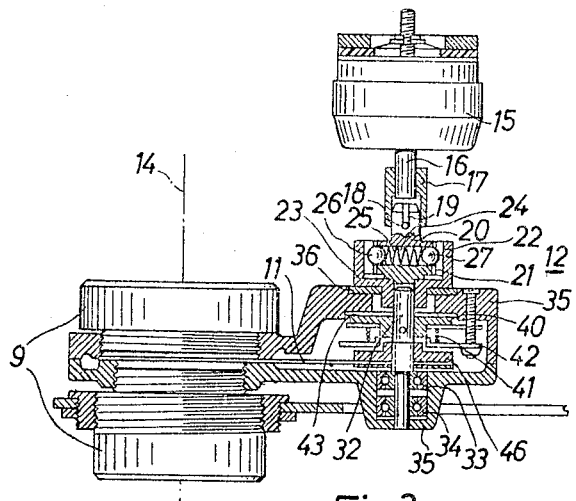
FIG. 3 is a sectional elevation of the structure of the invention, taken along line III—III of FIG. 2 in the direction of the arrows.

Referring now to FIG. 3, the drive means 12 is shown situated beside the objective means 9 which has the optical axis 14. The structure of FIG. 3 is also illustrated in a more functional manner in FIG. 4. The drive means includes a rotary electromagnet 15 having a rotary armature shaft 16 as well as an unillustrtaed return spring which acts on the armature shaft 16 to turn it to an unillustrated rest position when the electromagnet 15 is not energized. When this electromagnet is energized it will turn the rotary armature 16 through a predetermined angle. The axis of the rotary armature 16 extends parallel to the optical axis 14. The armature 16 fixedly carries a sleeve 17 which extends over the upper end of an elongated portion of an inner clutch member 20. The sleeve 17 has a cross pin 18 fixed to the sleeve 17 and extending across the open bottom end of the sleeve 17. This cross pin 18 is received in an axially extending transverse slot 19 formed in the upper end portion of the shaft portion 20 of the inner cylindrical clutch member which forms part of a clutch means described below. As may be seen from FIG. 5 the shaft portion 20 is integral with a larger coaxial cylindrical portion 21 which is received in the hollow interior 22 of a coaxial outer cylindrical component 23 of the clutch means. This part 21 of the clutch means is formed with a transverse bore 24 extending completely therethrough along a diameter of the cylindrical member 21, and in the interior of this transverse bore 24 is an elongated coil spring 25 which presses at its ends against a pair of ball members 26 and 27 which are thus urged outwardly from the axis of the inner clutch member 20, 21. These ball members are thus pressed against the inner surface of the outer cylindrical clutch member 23, and this inner surface of the outer clutch member 23 is formed with a plurality of depressions 28-31. It is particularly to be noted from FIG. 5 that the depressions 30 and 31 are diametrically opposed with respect to each other, while the depressions 28 and 29 are also diametrically opposed with respect to each other. In the position of the parts shown in FIG. 5 the ball members 26 and 27 are respectively received in the depressions 28 and 29, and the clutch means has another position where these ball members are respectively received in the depressions 30 and 31. It is to be noted that the pair of depressions 28 and 29 are of course situated along a diameter which is angularly displaced with respect to the pair of depressions 30 and 31, and the angular displacement between these diameters along which the depressions are located is preferably on the order of 20°. The outer cylindrical component 23 of the clutch means is coaxially fixed with a rotary shaft means 32 which is supported for rotation by the roller bearings 33 and 34 (FIGS. 3 and 4), this rotary shaft means extending into the shutter housing 35 which supports the bearings 33 and 34. It is to be noted that the rotary shaft means 32 extends parallel to the optical axis 14 and is of course situated adjacent to but beside the objective means 9.

The housing 35 fixedly carries a stop plate 36 situated in a plane perpendicular to the shaft 32, and as may be seen from FIG. 6, this stop plate 36 has stop edges 38 and 39 situated along a cutout of the plate 36, these stop edges 38 and 39 determining the shape of this cutout. The edge 39 extends parallel to the edge 38, and as indicated in FIG. 6, and a second pair of parallel stop edges are provided extending at an acute angle with respect to the edges 38 and 39, this second pair of parallel edges making, for example, an angle on the order of 20° with the edges 38 and 39 indicated in FIG. 6.

The bottom wall of the outer cylindrical clutch member 23, which is coaxially fixed to the top end of the shaft means 32, is provided with an elongated rib 37 extending diametrically across the bottom of the outer cylindrical member 23, and this diametrically extending rib 37 is situated in the cutout of the plate 36 between the stop edges thereof, so that when the rib 37 is in the shaded position indicated in FIG. 6 the side edges of the rib 37 will engage one pair of stop edges while when the rib 37 together with the outer clutch component 23 assume the position shown in dotted lines for the rib 37 in FIG. 6, then the edges 38 and 39 are engaged. The engagement of the rib 37 with these stop edges of the stop plate 36 determines the location of the shutter means 11 either in the open position shown in solid lines in FIG. 8 where the objective 9 is uncovered so that the light will pass therethrough in order to make an exposure, or in a closing position where the central axis of the single shutter blade 11 extends across the objective shown in dot-dash lines in FIG. 8, the blade 11 turning along the arc 14' at its portion which enters into and moves out of the objective for closing and opening the latter. Thus, the angle between the center lines of the shutter blade 11 shown in FIG. 8 corresponds to the angle between the positions of the stop rib 37 shown in FIG. 6, and in this way the structure of the invention determines the position of the stop rib.

The rotary shaft means 32 fixedly carries the blade 11 with the latter situated in a plane perpendicular to the shaft 32.

This rotary shaft means 32 extends freely through a brake disc 40 which is formed with an axial bore through which the shaft 32 passes with sufficient clearance to provide for free relative turning movement between the brake disc 40 and the shaft 32. The brake means includes in addition to the brake disc 40 a coil spring 41 which is situated between a plate 42 and the disc 40. The disc 40 is provided with a layer 43 of a suitable friction material which is situated between and engages the disc 40 and the housing 35. The distance of the plate 42 from the wall of the housing 35 which is parallel to the plate 42 can be adjusted by turning the screw 47, so that in this way the compression of the spring 41 can be regulated and thus the force of the brake means can be adjusted.

As is shown particularly in FIG. 7, the brake disc 40 is formed with an elongated groove 44 diametrically passing transversely across its lower face, this groove 44 being wider than the shaft 32, as is particularly apparent from FIG. 7. Within the groove 44 is situated a cross pin 45 which is fixed to the shaft 32 for rotation therewith, this pin 45 extending perpendicularly to the shaft 32 and having an elevation which reliably maintains within the groove 44 the pin 45. Therefore, after the shaft 32 has turned through a certain angle the pin 45 will engage the sides of the groove 44 so as to turn the brake disc 40 which by frictional engagement with the housing 35 retards the movement of the shaft 32 and thus produces the braking force.

The end of the shutter blade 11 which is connected to the shaft 32 is formed with an opening through which the shaft 32 passes and is situated between a pair of discs which are fixed on the one hand to the shaft 32 and on the other hand to the blade 11.

The above described structure operates in the following manner: When there is no current flowing through the electromagnet means 15, the retracting spring thereof retracts the armature 16 to an angular position which reliably maintains the shutter means 11 in its closed position extending across the optical axis and preventing light from passing through the objective. If, in order to begin an exposure cycle, the shutter is to be opened, then the electromagnet means 15 is energized by applying a suitable voltage thereto and this magnet remains energized as long as the shutter is maintained opened. The current in the armature of the magnet has the result of providing an axial shifting of the armature as well as a rotary movement thereof. The axial movement of the armature 16 only results in axial displacement of the pin 18 along the slot 19, but otherwise has no significant effect on the operations. The angular movement of the armature 16, however, results in angular turning of the inner clutch components, 20, 21, and because the clutch is engaged at this time by the ball members being situated in a pair of recesses referred to above, the shaft 32 turns together with the armature and the blade 11 is displaced toward its open position indicated in dotted lines in FIG. 2. At this time there is no relative turning between the inner and outer cylindrical clutch components and the cross pin 45 initially turns freely in the groove 44. In this way the shutter means 11 is displaced from its closed toward its open position, until the pin 45 engages the side surfaces of the groove 44, whereupon the brake means is actuated by turning of the disc 40 so that a braking force now retards the continued turning of the shaft means 32. The pressure of the spring 41 acting through the disc 40 and the layer of friction material 43 on the stationary wall of the housing 35 acts to slow down the movement of the blade 11 and the shaft means 32.

When the rib 37 engages the stop edges 38 and 39 of the stop means 36, the shaft means 32 has been braked to such an extent that it comes to a stop without any rebounding. The inertia of the armature and the force of the rotary electromagnet means 15, however, continues the turning of the armature 16, and since the outer clutch component 23 is now arrested by the stop means the ball members 26 and 27 yield in opposition to the force of the spring 25 and the inner clutch component 20, 21 now turns with respect to the outer clutch component 23. During this turning of the inner clutch component relative to the outer clutch component, the ball members ride along and rub against the inner surface of the outer clutch component, so that the armature of the electromagnet is braked in this way, and this continues until the ball members reach the pair of depressions 30 and 31, and the parts remain in this position until the electromagnet is deenergized whereupon the spring of the electromagnet returns the armature to its initial position resulting in return of the shutter to its closed position with the armature then displacing the inner clutch component with respect to the outer clutch component back to their original positions with respect to each other shown in FIG. 5.

Thus, when a signal is given to terminate the exposure the electromagnet 15 is deenergized with an unillustrated structure which does not form part of the present invention, and the return spring turns the armature 16 in the opposite direction back to its initial position. During the first part of this operation the brake disc 40 remains stationary, the braking force only being applied when the pin 45 swings to the opposite position again engaging the sides of the groove 44 so as to turn the brake disc 40 and thus apply the braking force only during the final portion of the movement of the shutter means, the shutter means now of course being displaced to its closed position. When the rib 37 engages the other pair of stop surfaces, the shutter is of course stopped in its closed position, and the ball members 26 and 27 are then displaced out of the depressions 30 and 31 to ride along the inner surface of the outer clutch component 23, thus braking the movement of the armature until the ball members again enter into the depressions 28 and 29. The parts are now back in their initial position with the shutter closed and the electromagnet is of course still deenergized.

The forces of the springs 25 and 41 are such that a greater force is required to displace the ball members 26 and 27 in opposition to the force of the spring 25 into the bore 24 than is required to displace the brake disc 40, so that in this way the ball members 26 and 27 will remain either in the depressions 28 and 29 or in the depressions 30 and 31 while the brake means 40 operates.

It will be understood that each of the elements described above, or two or more together, may also find a useful application in other types of optical copying machines differing from the types described above.

While the invention has been illustrated and described as embodied in shutters for optical copying machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an optical copying machine, in combination, objective means having a predetermined optical axis; rotary shaft means located beside said objective means and extending parallel to said optical axis; shutter means carried by said rotary shaft means for turning movement therewith between positions respectively closing and opening said objective means; rotary electromagnetic means operatively connected to said shaft means for turning the latter to displace said shutter means between said positions, said electromagnetic means turning through an angle greater than that through which said shutter means turns during displacement of the latter from one to the other of said positions thereof; and clutch means operatively connected to said shaft means and electromagnetic means for transmitting rotation of the latter to said shaft means, said clutch means yielding to provide for rotary movement of said electromagnetic means when the latter turns after said shutter means has stopped turning, said clutch means including an inner cylinder and an outer cylinder coaxially surrounding said inner cylinder, said cylinders being respectively connected to said shaft means and said electromagnetic means, and said inner cylinder being formed with a bore which receives a spring and part of a ball pressed by said spring outwardly of said bore against an inner surface of said outer cylinder, said inner surface of said outer cylinder being formed with a pair of depressions for receiving said ball and said depressions being angularly displaced from each other by an angle equal to the difference between the angle through which said rotary electromagnetic means turns and through which said shutter means turns.

2. In an optical copying machine, in combination, objective means having a predetermined optical axis; rotary shaft means located beside said objective means and extending parallel to said optical axis; shutter means carried by said rotary shaft means for turning movement therewith between positions respectively closing and opening said objective means; rotary electromagnetic means operatively connected to said shaft means for turning the latter to displace said shutter means between said positions, said electromagnetic means turning through an angle greater than that through which said shutter means turns during displacement of the latter from one to the other of said positions thereof; and clutch means operatively connected to said shaft means and electromagnetic means for transmitting rotation of the latter to said shaft means, said clutch means yielding to provide for rotary movement of said electromagnetic means when the latter turns after said shutter means has stopped turning, said clutch means including an inner cylinder and an outer cylinder coaxially surrounding said inner cylinder, said cylinders being respectively connected to said shaft means and said electromagnetic means, and said inner cylinder being formed with a bore which receives a spring and part of a ball pressed by said spring outwardly of said bore against an inner surface of said outer cylinder, said inner surface of said outer cylinder being formed with a pair of depressions for receiving said ball and said depressions being angularly displaced from each other by an angle equal to the difference between the angle through which said rotary electromagnetic means turns and through which said shutter means turns, and said inner cylinder having a second ball in said bore engaged by said spring, said bore extending diametrically across said inner cylinder and said second ball also being pressed outwardly of said inner cylinder against an inner surface of said outer cylinder at a part of the latter diametrically opposed to the part engaged by said first-mentioned ball, and said inner surface of said outer cylinder being formed with a pair of additional depressions diametrically opposed to said first-mentioned depressions for receiving said second ball.

3. In an optical copying machine, in combination, objective means having a predetermined optical axis; shutter housing means located beside said objective means and operatively connected therewith; turnable shaft means extending parallel to said optical axis and extending into said shutter housing means; shutter means fixed to said shaft means for to-and-fro turning movement therewith between two end positions closing and opening said objective means, respectively, and enclosing a predetermined angle; stop means carried by said housing means and cooperating with said shaft means for limiting the extent to which the latter turns with said shutter means so as to determine the open and closed positions of the latter; turnable electromagnetic means operatively connected to said shaft means for turning the latter between limiting positions provided by said stop means; and brake means operatively connected to said shutter housing means and said turnable shaft means for braking the turning movement thereof only after said rotary shaft means has moved said shutter means through a given initial angle between said position thereof.

4. In an optical copying machine, in combination, objective means having a predetermined optical axis; shutter housing means located beside said objective means and operatively connected therewith; rotary shaft means extending parallel to said optical axis and extending into said shutter housing means; shutter means fixed to said shaft means for rotation therewith between positions closing and opening said objective means; stop means carried by said housing means and cooperating with said shaft means for limiting the extent to which the latter turns with said shutter means so as to determine the open and closed positions of the latter; electromagnetic means operatively connected to said shaft means for turning the latter between limiting positions provided by said stop means; and brake means operatively connected to said shutter housing means and said rotary shaft means for braking the rotation thereof, said brake means including a brake disc formed with an axial bore through which said shaft means freely passes, said disc being formed with a diametrically extending groove at an end face of said disc, said groove extending diametrically across said shaft means, and said shaft means carrying a cross pin which is situated in said groove so that said shaft means together with said cross pin and shutter means can turn freely relative to said brake means until said cross pin engages a side surface of said groove so as then to continue the turning of said shaft means and shutter means while moving said brake disc to actuate said brake means.

5. In an optical copying machine, in combination, objective means having a predetermined optical axis; shutter housing means located beside said objective means and operatively connected therewith; rotary shaft means extending parallel to said optical axis and extending into said shutter housing means; shutter means fixed to said shaft means for rotation therewith between positions closing and opening said objective means; stop means carried by said housing means and cooperating with said shaft means for limiting the extent to which the latter turns with said shutter means so as to determine the open and closed positions of the latter; electromagnetic means operatively connected to said shaft means for turning the latter between limiting positions provided by said stop means; and brake means operatively connected to said shutter housing means and said rotary shaft means for braking the rotation thereof, said brake means including a brake disc formed with an axial bore through which said shaft means freely passes, said disc being formed with a diametrically extending groove at an end face of said disc, said groove extending diametrically across said shaft means, and said shaft means carrying a cross pin which is situated in said groove so that said shaft means together with said cross pin and shutter means can turn freely relative to said brake means until said cross pin engages a side surface of said groove so as then to continue the turning of said shaft means and shutter means while moving said brake disc to actuate said brake means, said cross pin turning together with said shaft means through approximately 20° before engaging said surface of said groove for setting said brake means into operation.

6. In an optical copying machine, in combination, objective means having a predetermined optical axis; rotary shaft means located adjacent said objective means and extending parallel thereto; shutter means carried by said rotary shaft means to be turned thereby between positions closing and opening said objective means; rotary electromagnetic means having a stroke which is greater than the angle through which said rotary shaft means turns between its open and closed positions; clutch means operatively connected to said shaft means and electromagnetic means for transmitting turning movement of the latter to said shaft means, said clutch means yielding when said electromagnetic means continues to move after said shutter means has been displaced from one to the other of its positions; and brake means for braking the turning of said rotary shaft means and shutter means therewith only after said rotary shaft means has moved said shutter means through a given initial angle between said positions thereof, said clutch means exerting a force great enough to overcome the force of said brake means.

7. In an optical copying machine, in combination, objective means having a predetermined optical axis; turnable shaft means located beside said objective means and extending parallel to said optical axis; shutter means carried by said turnable shaft means for to-and-fro turning movement therewith between two end positions enclosing a predetermined angle for closing and opening said objective means, respectively; turnable electromagnetic means mounted for to-and-fro turning movement through an angle greater than said predetermined angle through which said shutter means turns to-and-fro during displacement of the latter between said two end positions thereof; and yieldable clutch means operatively connecting said turnable shaft means and said turnable electromagnetic means for transmitting turning impulses of the latter to said turnable shaft means, said clutch means yielding to provide for turning movement of said electromagnetic means together with said shutter means have stopped turning.

8. In an optical copying machine according to claim 7, said yieldable clutch means directly coupling said turnable shaft means to said turnable electromagnetic means for transmitting directly from said turnable electromagnetic means to said turnable shaft means turning impulses of the former.

9. In an optical copying machine according to claim 7, said turnable electromagnetic means turning through an angle approximately 20 degrees greater than said shutter means.

10. In an optical copying machine according to claim 7, shutter housing means located beside said objective means and operatively connected therewith; and stop means carried by said housing means and cooperating with said turnable shaft means for limiting the extent to which the latter turns with said shutter means so as to determine the open and closing positions of the latter.

11. In an optical copying machine according to claim 7, said clutch means including a first clutch element connected to said turnable shaft means, a second clutch element connected to said turnable electromagnetic means and torque transmitting means connecting said clutch elements for transmission of a relatively high torque when said clutch elements are in either of a pair of predetermined relative angular positions and for transmission of a relatively low torque when said clutch elements are not in one of said predetermined relative angular positions.

12. In an optical copying machine according to claim 3, adjusting means operatively connected to said brake means for adjusting the brake force thereof.

References Cited by the Examiner

UNITED STATES PATENTS

| | | | |
|---|---|---|---|
| 2,685,239 | 8/1954 | Doyle | 95—53 |
| 2,878,735 | 3/1959 | Willcox | 95—63 |
| 3,004,482 | 10/1961 | Muller | 95—31 |
| 3,093,047 | 6/1963 | Neff | 95—59 |

JOHN M. HORAN, *Primary Examiner.*